(12) United States Patent
Lawo

(10) Patent No.: US 11,689,691 B2
(45) Date of Patent: Jun. 27, 2023

(54) METHOD AND DEVICE FOR AUTOMATICALLY EVALUATING AND PROVIDING VIDEO SIGNALS OF AN EVENT

(71) Applicant: LAWO HOLDING AG, Rastatt (DE)

(72) Inventor: Philipp Lawo, Rastatt (DE)

(73) Assignee: LAWO HOLDING AG, Rastatt (DE)

( * ) Notice: Subject to any disclaimer, the term of this patent is extended or adjusted under 35 U.S.C. 154(b) by 183 days.

(21) Appl. No.: 17/298,176

(22) PCT Filed: Dec. 4, 2019

(86) PCT No.: PCT/EP2019/000332
§ 371 (c)(1),
(2) Date: May 28, 2021

(87) PCT Pub. No.: WO2020/114623
PCT Pub. Date: Jun. 11, 2020

(65) Prior Publication Data
US 2022/0103779 A1    Mar. 31, 2022

(30) Foreign Application Priority Data

Dec. 5, 2018 (DE) .................. 10 2018 009 571.2

(51) Int. Cl.
*H04N 5/77* (2006.01)
*G06V 20/17* (2022.01)
*G06V 20/40* (2022.01)
*H04N 7/18* (2006.01)

(52) U.S. Cl.
CPC .............. *H04N 5/77* (2013.01); *G06V 20/17* (2022.01); *G06V 20/44* (2022.01); *H04N 7/185* (2013.01); *G06V 2201/10* (2022.01)

(58) Field of Classification Search
CPC .. H04N 21/21805; H04N 21/84; H04N 7/185; H04N 5/77; G06V 20/17; G06V 20/44; G06V 2201/10; G06F 16/78
USPC ......................... 386/224, 226, 223, 230, 322
See application file for complete search history.

(56) References Cited

U.S. PATENT DOCUMENTS

| 6,748,158 B1 | 6/2004 | Jasinschi et al. |
| 2010/0007730 A1* | 1/2010 | Lin .................. G08B 13/19682 348/143 |
| 2011/0302130 A1 | 12/2011 | Lee et al. |
| 2016/0026874 A1 | 1/2016 | Hodulik et al. |
| 2016/0055883 A1 | 2/2016 | Soll et al. |
| 2017/0075508 A1 | 3/2017 | Borel et al. |

FOREIGN PATENT DOCUMENTS

| CN | 108287924 A | 7/2018 |
| EP | 1213667 A2 | 6/2002 |
| JP | 3762149 B2 * | 4/2006 |

(Continued)

*Primary Examiner* — Robert Chevalier
(74) *Attorney, Agent, or Firm* — McGlew and Tuttle, P.C.

(57) ABSTRACT

The invention relates to a method and a device for evaluating and providing video signals of an event. A uniform time signal is assigned to recorded video signals of the event, and to captured camera parameters and metadata, after which the video signals are automatically evaluated in a data processing device on the basis of a user input. This way, a desired portion of the video signals can be provided to the user on the basis of the evaluation.

12 Claims, 2 Drawing Sheets

(56) References Cited

FOREIGN PATENT DOCUMENTS

Figure 1:
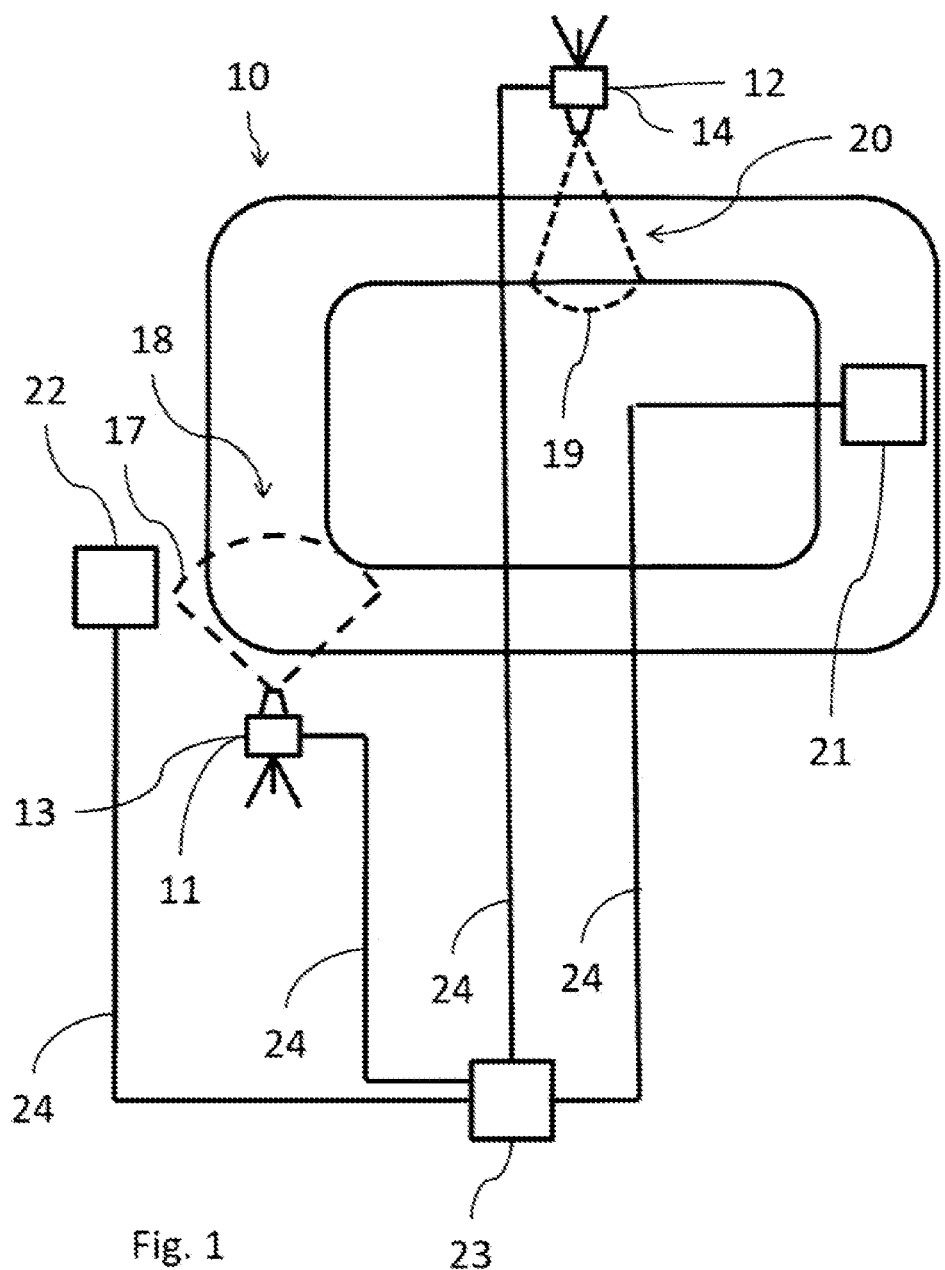

| | | | | |
|---|---|---|---|---|
| JP | 2004194159 | A | * | 4/2007 |
| JP | 4263890 | B2 | * | 5/2009 |
| WO | 2008046243 | A1 | | 4/2008 |
| WO | 2015162548 | A1 | | 10/2015 |

* cited by examiner

METHOD AND DEVICE FOR AUTOMATICALLY EVALUATING AND PROVIDING VIDEO SIGNALS OF AN EVENT

The invention relates to a method and a device for automatically evaluating and providing video signals of an event.

Events in the context of the invention are, for example, sporting events such as ball games, running competitions, road races, or the like, in which cameras are used to record actions at certain, also changing locations, such as ball positions, shots on goal, overtaking maneuvers, sprints to the finish or the like. Usually, several cameras are used to record the events in different places, from different positions and from different angles. All of the video signals recorded by the cameras are usually sent to a control room, as well as to an outside broadcast vehicle, in which a competent person selects the video signal to be transmitted to a television transmitter from the multitude of individual video signals from the cameras. The video signals that are not sent are usually lost.

For some time now, there has been a growing interest in the video signals which are not sent. For example, clubs can use these video signals, which show their players or their opponents, to assess their individual performance. The coaches or racing teams are also interested in all of the recordings of their runners, cyclists, racing cars, etc. during races. Therefore, every recorded video signal can be relevant to respective groups of users, especially at sporting events. To filter out the relevant part of a video signal for various user groups, one option is to manually monitor and cut all video signals, which, however, requires immense effort. In addition, efforts are being made to develop technical methods for evaluating the video signals, which methods can be used in place of the purely manual selection. These methods analyze the video signals by means of image processing algorithms for detecting objects involved in the event, for example vehicles and/or players. However, these methods are complex, slow and expensive, such that they are currently only economical to a limited extent.

The object of the invention therefore is to create an improved option for providing individual video material of an event, while avoiding the disadvantages of the prior art.

The object of the invention is solved by a method having the following steps: the video signals, camera parameters and/or metadata assigned to the time signal, and/or the provided portion of the video signals are stored on a data carrier.

Capturing at least one time signal;

Recording video signals by means of at least one camera and automatically assigning the time signal or signals to the video signals;

Capturing local camera parameters at the location of the camera and automatically assigning the time signal(s) to the camera parameters, the camera parameters being at least one parameter from the group of: position of the camera, acceleration of the camera, orientation of the camera, camera angle, magnetic field, field of view, air pressure, audio volume, brightness, time, current power consumption;

Capturing metadata by means of at least one metadata sensor and automatically assigning the time signal(s) to the metadata, the metadata being at least one parameter from the group of: geographical data, object positions, transmission data, object-specific data, statistics, databases, local audio volume, user-defined parameters;

Transmitting the video signals, camera parameters and metadata assigned to the time signal(s) to a data processing device;

Automatically evaluating the video signals assigned to the time signal(s) on the basis of the camera parameters assigned to the time signal, the metadata assigned to the time signal and a user input, and Providing at least a portion of the video signals on the basis of the evaluation.

The aforementioned object is also solved by a device having data-capturing devices such as a camera for recording video signals, at least one camera sensor for capturing local camera parameters, at least one metadata sensor for capturing metadata, and a data processing device for receiving the video signals, camera parameters and metadata assigned to a time signal, for evaluating the video signals and for providing at least a portion of the video signals, wherein the camera, the camera sensor and the metadata sensor are connected to the data processing device and wherein the camera sensor is connected to the camera.

The invention is based on the idea of evaluating the video signals on the basis of the camera parameters and on the basis of the metadata, which idea represents an alternative to known image processing algorithms. The video signals, the camera parameters and the metadata can be clearly assigned to one another and synchronized by means of common time signals. This in particular allows for automatically evaluating the video signals assigned to the time signal on the basis of the camera parameters and the metadata, such that the portion of the video signals which is of interest can be provided to a user.

The time signal in the context of the invention is, for example, a time specification, in particular the time at the location of the camera, measured in milliseconds. Alternatively or additionally, the time signal can be designed as a stopwatch and have an incremental counter. The time signal is preferably designed such that a unique time value can be assigned to each image of the video signal. In this respect, the time signal has the function of a unique time stamp.

Camera parameters in the context of the invention are parameters which characterize the properties of the assigned camera, for example the currently set camera angle, the inclination and the position of the camera, the latter being measurable by means of a GPS sensor. To acquire the camera parameters, at least one camera sensor is provided which, for example, can be designed as a gyroscope for acquiring the camera angle and/or as an (electronic) compass for acquiring the camera orientation. The camera parameters are preferably assigned to the video signals at the same time as the video signals are recorded.

In the context of the invention, metadata in particular are parameters of the event. In a soccer game, this could be the current position of the ball and/or the current positions of the players, which can be captured using commonly used tracking methods. Current game point scores are also metadata. In a race, metadata are, for example, the current positions of the drivers or vehicles and/or their current ranking in the race. The metadata is determined, for example, by means of commonly used tracking methods, interfaces and/or by means of GPS sensors. Metadata can also be broadcast data providing information on whether a certain portion of the video signal was transmitted, for example in the context of a television broadcast. In the context of the invention, metadata are also user-defined parameters such as player and/or vehicle names, individual statistics and other information on players and/or vehicles, which can be imported from databases, for example the goal scoring rate of a soccer player. Preferably, the audio volume information, measured by a microphone set up physically separated from the camera, is also metadata in the context of the invention. This way, audio volume information from a fan stand in a football stadium, for example, can be recorded as metadata in the context of the invention.

The scope of the invention includes that metadata can (also) be captured via devices or ways other than a camera, and that metadata and video and audio signals are processed by a (central) data processing device. A (central) data processing device, independent of (local) capturing devices such as cameras, for processing metadata is therefore preferably provided. The data from all data sources are thus linked to the common global time and, accordingly, with each other, or are blocked or locked relative to one another in this manner. This ensures the temporal assignment or connection of all data, namely metadata and video and audio signals.

Transmitting the video signals, the camera parameters and the metadata to the data processing device can be carried out by means of cables and/or wirelessly, wherein the transmission in the latter case can be carried out by means of WLAN, Bluetooth and/or radio, for example.

A user input for evaluating the video signals according to the invention is, for example, a query based on a combination of several criteria, for example the query at which time a specific vehicle was captured by a specific camera.

In one embodiment of the invention, the video signals are recorded by means of a single camera, the position and camera angle of which are changed during the event and are captured as camera data. For example, audio volume information of a spectator area is recorded as metadata by means of multiple external microphones, wherein a high volume can indicate an important incident, for example a shot on goal. If the noteworthy moments (highlights) of an event are requested by a user input, those portions of the video signals in which the audio volume of the metadata is significantly increased are provided as a response.

The capturing of the time signal, the recording of the video signals, the capturing of the camera parameters and the capturing of the metadata are preferably synchronized in time, such that assigning the video signals, the camera parameters and the metadata to the time signal data is simplified. For example, camera parameters and metadata can be captured whenever a single image of the video signals is recorded. Alternatively or additionally, the video signals from multiple cameras can be recorded in a time-synchronized manner. In particular, the time signal can be assigned to the video signals at the same time as the video signals are recorded. This can apply analogously to assigning the time signal to the camera parameters and/or to the metadata.

In a further embodiment of the invention, the capturing of the time signal, the recording of the video signals and the capturing of the camera parameters take place over the entire duration of the event, so as to be able to use the complete data set generated during the entire event for the automatic evaluation. The metadata are preferably also captured over the entire duration of the event.

The various data sources preferably operate with a global time source and thus with a global time such as GPS time, NTP (Network Time Protocol) or PTP (Precision Time Protocol), such that the metadata can be centrally connected with respect to time with image, video or audio signals, without being processed in a capturing device. All data are tagged with the common global time. The data of all data sources are thus connected to the common global portion and, accordingly, to one another, such that they are blocked or locked relative to one another. This ensures the temporal assignment or connection of all data, namely metadata and video and audio signals.

It is also possible that the metadata can only be captured if a parameter of the metadata falls below and/or exceeds a user-defined threshold value. This prevents the accumulation of too large an unused amount of data. For example, a local audio volume can only be recorded if the sound level is above a user-defined threshold value. A high audio volume can indicate a significant incident, such as a foul or an overtaking maneuver.

In a further embodiment of the invention, the steps of evaluating and providing the portion of the video signals are carried out during the event, such that the portion of the video signals desired by the user can be provided even during the event, in particular continuously. In one example, a user requests the highlights of the event. The continuous evaluation during the event determines the time signal at which an increased audio volume is detected in a fan area, which indicates a significant highlight. By determining the time signals of all highlights, the corresponding portions of the video signals can be provided to the user before the end of the event.

Further metadata are preferably generated when the video signals are evaluated. In this way, object or person-related statistics can be created or supplemented. This step can be automated, such that the newly created statistics are available again as metadata when the video signals are evaluated.

The video signals, the camera parameters, the metadata and/or the provided part of the video signals can be stored on a data carrier, preferably in the form of a database, such that archiving and/or later evaluation is made possible.

In the device according to the invention, the metadata sensor can be positioned physically separate from the camera sensor. Furthermore, each camera is preferably assigned a camera sensor, which in particular is integrated with the camera assigned to it.

In a further embodiment of the invention, at least one camera is arranged on a flying object, in particular on a drone, such that the camera can be moved quickly and easily.

Figure 2:
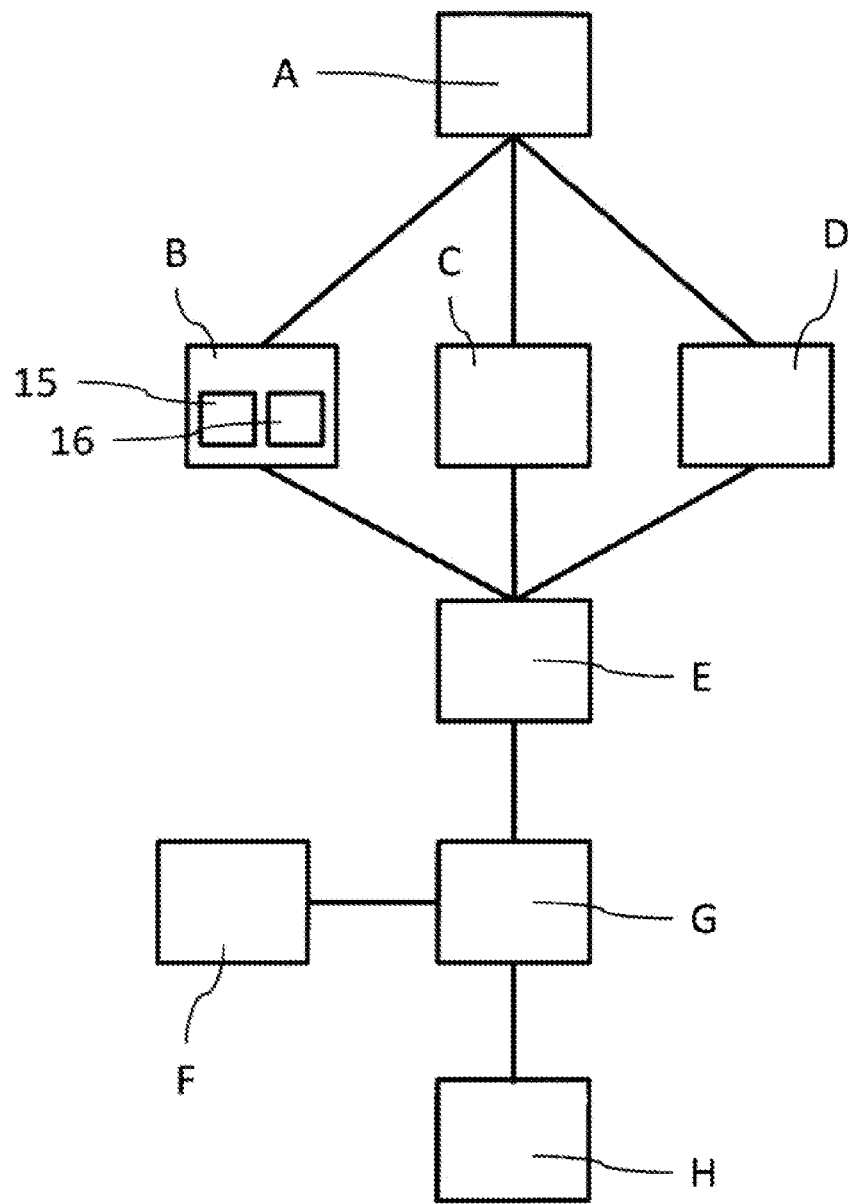

Further advantages and features of the invention can be found in the claims and in the following description, in which an embodiment of the invention is explained in detail with reference to the drawings. In the drawings:

FIG. 1 is a schematic representation of the device according to the invention and FIG. 2 is a flowchart of the method according to the invention.

FIG. 1 is a schematic sketch of a running track 10, for example a running track 10 for a medium-distance run, in which runners (not shown in FIG. 1) race along the running track 10 while being filmed by two cameras 11, 12 at the edge of the running track 10. By way of example, FIG. 1 shows a first camera 11 and a second camera 12, which are arranged at different positions at the edge of the running track 10. During the run, the first camera 11 records a first video signal 15 and the second camera 12 records a second video signal 16, which is schematically illustrated in the flowchart in FIG. 2.

Each of the cameras 11, 12 have an integrated camera sensor 13, 14, the first camera sensor 13 being connected to the first camera 11 and the second camera sensor 14 being connected to the second camera 12. The first camera sensor 13 captures local camera parameters of the first camera 11 during the run. Local camera parameters in the example of FIG. 1 are the geographic position of the camera, its orientation and its camera angle. The geographical position of the camera is measured with a GPS sensor, the orientation with an electric compass and the camera angle with an electric gyroscope in combination with a software interface to the camera. The GPS sensor, the electric compass, the electric gyroscope and the software interface are designed integrally as a first camera sensor 13, which outputs the captured camera parameters via a further interface. Just like the first camera sensor 13, the second camera sensor 14 captures the local camera parameters of the second camera 12 during the run.

For example, in FIG. 1 the first camera 11 has a first camera angle 17 which, in particular, captures a curve 18 of the race track 10 and which is greater than a second camera angle 19 of the second camera 12. The second camera angle 19 of the second camera 12 is oriented toward a finish line area 20 of the running track 10. In the example shown, the camera angle 17, 19 designates the geographical area captured by the camera 11, 12. As the second camera angle 19 is smaller than the first camera angle 17, an enlarged image results, which makes it easier to assess which of the runners is the first to cross the finish line area 20. The camera angles 17, 19 of the cameras 11, 12 can be changed over time and are continuously captured as camera parameters by the camera sensors 13, 14 assigned to the cameras 11, 12.

The runners, not shown in FIG. 1, are each provided with a metadata sensor 21 in the form of a GPS sensor in order to detect the geographical positions of the runners on the running track 10 at any time during the run. By way of example, a GPS sensor 21 is arranged in the right-hand region of FIG. 1. In addition, a second metadata sensor 22 in the form of a microphone is arranged on the left-hand side of FIG. 1 to measure the audio volume of the spectators during the run.

The cameras 11, 12, the camera sensors 13, 14 and the metadata sensors 21, 22 are each connected to a data processing device 23, wherein the connections in FIG. 1 are represented by connecting lines 24, but can alternatively also be designed as wireless connections.

The method according to the invention will be explained with reference to FIGS. 1 and 2, wherein FIG. 2 is a schematic flowchart.

From the time the start signal is given, a continuous time signal of a global time system such as GPS time, NTPO or PTP is captured during the run in every data capturing device, such as in every camera—i.e., in particular locally— which indicates the time, preferably in milliseconds, and which consequently serves as a uniform time stamp. This method step is represented as A in FIG. 2.

In addition, the two cameras 11, 12 of FIG. 1 each record continuous video signals 15, 16 during the run. The respective time signals are automatically assigned to each individual image of the video signals 15, 16. This method step is marked as B on the upper left-hand side of FIG. 2.

At the same time as the video signals 15, 16 are recorded, metadata, such as in particular the positions, orientations and camera angles of the two cameras 11, 12, are captured as camera parameters by the camera sensors 13, 14, and the corresponding global time signal is also automatically assigned to them (section C).

Simultaneously, the GPS sensor 21 continuously captures the current position of the runner assigned to it, and the microphone 22 captures the current audio volume of the spectators. Both metadata are automatically assigned the respective current time signals as they are captured by the metadata sensors 21, 22 (section D).

Even during the event, the video signals, camera data and metadata assigned to the time signal are transmitted to the data processing device 23 in a next method step E. In the example shown in FIGS. 1 and 2, the runner's trainer is interested in the performance during the run and therefore triggers a user input to the data processing device 23 in a next method step F, by requesting video signals in which this specific runner is visible. This user input is registered in the data processing device 23 such that the recorded video signals 15, 16 are analyzed to determine whether the runner is visible in the video signals 15, 16; see method step G in FIG. 2.

For the first camera 11, this is the case, for example, when the geographical position of the runner, which position is continuously captured by the GPS sensor 21, is covered by the first camera angle 17. In this case, the data processing device 23 only provides that portion of the first video signal 15 in which the runner is visible. The process for automatically evaluating the second video signals 16 from the second camera 12 is analogous. Evaluating the video signals 15, 16 is carried out during the event and simultaneously for all video signals 15, 16. In a last method step H in FIG. 2, the data processing device 23 provides the user with the desired portions of the video signals 15, 16, in which the runner is visible.

In a second example, the user input is a request from a broadcaster for the highlights of the race. This user input is interpreted by the data processing device 23 such that it searches for time signals in which the microphone 22 at the edge of the running track 10 has recorded significantly high audio volumes as metadata. These indicate particularly significant incidents. After the data processing device 23 has determined the time signals in which high audio volume levels were measured, the first video signals 15 from the first camera 11 assigned to the time signals are determined, as the first camera 11 is arranged closest to the microphone 22. The remainder of evaluating and providing the desired portion of the video signals 15, 16 is carried out analogously to the previous example. This will provide the user with the highlights of the event.

The invention claimed is:

1. A method for automatically evaluating and providing video signals of an event, the method comprising the steps of:
   capturing at least one time signal;
   recording video signals by means of at least one camera and automatically assigning the time signal(s) to the video signals;
   capturing local camera parameters at the location of the camera and automatically assigning the time signal(s) to the camera parameters, wherein the camera parameters are at least one parameter from the group of: position of the camera, acceleration of the camera, orientation of the camera, camera angle, magnetic field, field of view, air pressure, audio volume, brightness, time, current power consumption;
   capturing metadata by means of at least one metadata sensor and automatically assigning the time signal(s) to the metadata, wherein the metadata are at least one parameter from the group of: geographical data, object positions, transmission data, object-specific data, statistics, databases, local audio volume, user-defined parameters;
   transmitting the video signals, camera parameters and metadata assigned to the time signal(s) to a data processing device;
   automatically evaluating the video signals assigned to the time signal(s) on the basis of the camera parameters assigned to the time signal, the metadata assigned to the time signal and a user input; and providing at least a portion of the video signals on the basis of the evaluation.

2. The method according to claim 1, wherein data comprised of at least one of metadata, video, image and audio data are assigned an immediately imprecise time signal of a global time system such as GPS time, NTP or PTP.

3. The method according to claim 1, wherein the capturing of the time signal, the recording of the video signals, the capturing of the camera parameters and the capturing of the metadata are synchronized in time.

4. The method according to claim 1, wherein the capturing of the time signal and the recording of the video signals and/or the capturing of the camera parameters are carried out for the an entire duration of the event.

5. The method according to claim 4, wherein the metadata are captured over the entire duration of the event.

6. The method according to claim 1, wherein the metadata are only captured if a parameter of the metadata falls below and/or exceeds a user-defined threshold value.

7. The method according to claim 1, wherein the steps of evaluating the video signals and providing the portion of the video signals are carried out during the event.

8. The method according to claim 1, wherein additional metadata are generated while evaluating the video signals.

9. The method according to claim 1, wherein the video signals, camera parameters and/or metadata assigned to the time signal, and/or the provided part of the video signals are stored on a data carrier.

10. A device comprising:
at least one camera for recording video signals;
at least one camera sensor for capturing local camera parameters;
at least one metadata sensor for capturing metadata;
a data processing device for receiving the video signals, camera parameters and metadata assigned to a time signal, for evaluating the video signals and for providing at least a portion of the video signals wherein the camera, the camera sensor and the metadata sensor are connected to the data processing device and wherein the camera sensor is connected to the camera, wherein the device is configured to:
capture one or more time signals;
record video signals by means of the at least one camera and assign the one or more time signals to the video signals;
capture local camera parameters by means of the at least one camera sensor at a location of the camera and assign the one or more time signals to the camera parameters, wherein the camera parameters are at least one parameter from the group of: position of the camera, acceleration of the camera, orientation of the camera, camera angle, magnetic field, field of view, air pressure, audio volume, brightness, time, current power consumption;
capture metadata by means of the at least one metadata sensor and assign the one or more time signals to the metadata, wherein the metadata are at least one parameter from the group of: geographical data, object positions, transmission data, object-specific data, statistics, databases, local audio volume, user-defined parameters;
transmit the video signals, camera parameters and metadata assigned to the one or more time signals to a data processing device;
evaluate, by means of the data processing device, the video signals assigned to the one or more time signals on the basis of the camera parameters assigned to the time signal, the metadata assigned to the time signal and a user input; and
provide, by means of the data processing device, at least a portion of the video signals on the basis of the evaluation.

11. The device according to claim 10, wherein the at least one camera, the at least one camera sensor and the at least one metadata sensor comprise data capturing devices, and one or more of the data capturing devices have time capturing modules for capturing a uniform global time such as GPS time, NTP or PTP.

12. The device according to claim 10, wherein the at least one camera is arranged on a flying object.

* * * * *